United States Patent [19]
Kurose et al.

[11] Patent Number: 5,935,714
[45] Date of Patent: Aug. 10, 1999

[54] MAGNETIC RECORDING MEDIUM

[75] Inventors: Shigeo Kurose; Akira Somiya, both of Nagano, Japan

[73] Assignee: TDK Corporation, Tokyo, Japan

[21] Appl. No.: 08/764,975

[22] Filed: Dec. 13, 1996

[30] Foreign Application Priority Data

Dec. 26, 1995 [JP] Japan ...................................... 7-338430

[51] Int. Cl.$^6$ .................................................. G11B 5/702
[52] U.S. Cl. .................. 428/425.9; 428/522; 428/694 B; 428/694 BG; 428/694 BU; 428/900
[58] Field of Search ................................ 428/425.9, 522, 428/694 B, 694 BU, 694 BG, 900

[56] References Cited

U.S. PATENT DOCUMENTS

| | | | |
|---|---|---|---|
| 5,153,053 | 10/1992 | Hashimoto et al. | 428/215 |
| 5,536,567 | 7/1996 | Kato et al. | 428/323 |

FOREIGN PATENT DOCUMENTS

| | | |
|---|---|---|
| 3-286419 | 12/1991 | Japan . |
| 5-307734 | 11/1993 | Japan . |
| 7-153055 | 6/1995 | Japan . |
| 7-235044 | 9/1995 | Japan . |
| 7-099573 | 10/1995 | Japan . |

*Primary Examiner*—Stevan A. Resan
*Attorney, Agent, or Firm*—Stephen F. K. Yee

[57] ABSTRACT

A magnetic recording medium having good dispersibility, dispersion stability of a magnetic paint and electromagnetic characteristics, and excellent running durability and still characteristics, comprises a non-magnetic support and a magnetic layer formed thereon which is mainly composed of a magnetic powder and a binder, wherein said binder is a mixture of i) a vinyl chloride copolymer having amine-modified vinyl units and acidic functional group-containing vinyl units in a molecule, ii) a polyurethane resin having a number average molecular weight of 5000 to 25000 (Mn 1), and iii) a polyurethane resin having a number average molecular weight of higher than 25000 to 100000 (Mn 2).

7 Claims, No Drawings

MAGNETIC RECORDING MEDIUM

BACKGROUND OF THE INVENTION

The present invention relates to a magnetic recording medium having a magnetic layer obtained by applying a magnetic paint (magnetic coating materials) containing a ferromagnetic powder used for recording and reproducing images, voices and data.

Previously, some magnetic recording media have been known which have magnetic layers formed by applying magnetic paints comprising magnetic powders and binders to non-magnetic supports, said binders being combinations of a plurality of resins.

For example, magnetic recording media have been known such as "a magnetic recording medium comprising a non-magnetic support and a magnetic layer formed thereon comprising a ferromagnetic metal powder and a binder, wherein said binder comprises three kinds of binder resins different from one another in glass transition temperature (Tg), and a mixed resin composition of these three kinds of resins has a glass transition temperature (Tg) of 30° C. to 47° C." (Japanese Patent Unexamined Publication No. 3-286419), "a magnetic recording medium comprising a non-magnetic support and a magnetic layer formed thereon comprising a ferromagnetic powder and a binder, wherein said binder consists of at least two kinds of polyester-polyurethane resins different from each other in glass transition temperature, and has a glass transition temperature of 10° C. to 60° C. as a whole" (Japanese Patent Unexamined Publication No. 5-307734), and "a magnetic recording medium comprising a non-magnetic support and a magnetic layer formed thereon comprising a ferromagnetic powder and carbon black dispersed in a binder, wherein said binder contains a copolymer having amine-modified vinyl units and acidic functional group-containing vinyl units, and said carbon black has a specific surface area of 90 $m^2/g$ to 330 $m^2/g$ and a DBP oil absorption of 45 ml/100 g to 120 ml/100 g" (Japanese Patent Unexamined Publication No. 7-153055).

Japanese Patent Unexamined Publication No. 3-286419 described above discloses that the three kinds of resins different from one another in glass transition temperature are used as the binder, thereby obtaining the magnetic recording medium excellent in surface properties and mechanical strength and improved in durability. Further, Japanese Patent Unexamined Publication No. 5-307734 discloses that at least two kinds of polyester-polyurethane resins different from each other in glass transition temperature are used as the binder, thereby resulting an improvement in electromagnetic characteristics. However, both of them do not describe vinyl chloride copolymers in detail, and have a problem with respect to the dispersibility of paints. Japanese Patent Unexamined Publication No. 7-153055 is directed to the use of the copolymer having amine-modified vinyl units and acidic functional group-containing vinyl units in a molecule as the binder, which provides the magnetic recording medium excellent in dispersibility. However, it is silent on the use of two kinds of polyurethane resins.

For conventional techniques, problems are left unsolved with regard to the dispersibility and the dispersion stability of the magnetic paints. As a result, the electromagnetic characteristics are deteriorated, resulting in a problem with respect to running durability. It has been therefore desired to provide a magnetic recording medium excellent in both the electromagnetic characteristics and the running durability.

SUMMARY OF THE INVENTION

In order to solve the above-mentioned problems, the present inventors have conducted intensive investigations. As a result, the inventors have discovered that the above-mentioned problems can be solved by the use of a binder comprising a mixture of a vinyl chloride copolymer having a specified functional group and two kinds of polyurethane resins each having specified molecular weights different from each other, thus completing the present invention.

That is, the present invention provides:

(1) a magnetic recording medium comprising a non-magnetic support and a magnetic layer formed thereon which is mainly composed of a magnetic powder and a binder, wherein said binder is a mixture of
  i) a vinyl chloride copolymer having amine-modified vinyl units and acidic functional group-containing vinyl units in a molecule,
  ii) a polyurethane resin having a number average molecular weight of 5000 to 25000 (Mn 1), and
  iii) a polyurethane resin having a number average molecular weight of higher than 25000 to 100000 (Mn 2);

(2) the magnetic recording medium described in (1), wherein said vinyl chloride copolymer has an average degree of polymerization of 200 to 800;

(3) the magnetic recording medium described in (1), wherein the content of the amine-modified vinyl units contained in the vinyl chloride copolymer is 0.03% to 2.3% by weight, and the content of the acidic functional group-containing vinyl units is 0.05% to 1.8% by weight;

(4) the magnetic recording medium described in (1), wherein a primary amine, a secondary amine or a tertiary amine is contained as the amine-modified vinyl unit, and a carboxyl group, a sulfonic acid group, a sulfuric acid group, a phosphoric acid group or a phosphonic acid group is contained as the acidic functional group-containing vinyl unit;

(5) the magnetic recording medium described in (1), wherein said polyurethane resin having a number average molecular weight of 5000 to 25000 (Mn 1) is a polyester-polyurethane resin, a polyetherpolyurethane resin or a polycarbonatepolyurethane resin;

(6) the magnetic recording medium described in (1), wherein said polyurethane resin having a number average molecular weight of higher than 25000 to 100000 (Mn 2) is a polyesterpolyurethane resin, a polyetherpolyurethane resin or a polycarbonatepolyurethane resin; and (7) the magnetic recording medium described in (1), wherein said vinyl chloride copolymer is contained in an amount of 20% to 80% by weight based on the total amount of the binder, said polyurethane resin of Mn 1 is contained in an amount of 10% to 50% by weight, said polyurethane resin of Mn 2 is contained in an amount of 10% to 50% by weight, and the total amount of said polyurethane resin of Mn 1 and, said polyurethane resin of Mn 2 is 20% to 80% by weight.

DESCRIPTION OF THE PREFERRED EMBODIMENTS

In the present invention, a vinyl chloride copolymer having amine-modified vinyl units and acidic functional group-containing vinyl units in a molecule is used in combination with two kinds of polyurethane resins, each having the specified molecular weights described above as a binder, thereby being able to form a paint improved in dispersibility and paint stability, and to obtain a magnetic recording medium improved in electromagnetic characteristics and running durability.

The acidic functional group-containing vinyl unit contained in the vinyl chloride copolymer used in the present invention is a vinyl unit containing at least one kind of functional group such as a carboxyl group, a sulfonic acid group, a sulfuric acid group, a phosphoric acid group or a phosphonic acid group. The vinyl unit may be any as long as it has the above-mentioned functional group. The carboxyl group-containing vinyl groups include, for example, maleic acid, fumaric acid, acrylic acid and methacrylic acid. The sulfonic acid group-containing vinyl groups include sodium styrenesulfonate, sodium vinylsulfonate, sodium methacrylsulfonate and sulfoethyl acrylate. Of these, particularly preferred are maleic acid or fumaric acid having a carboxyl group, sulfoethyl acrylate or sodium methacrylsulfonate having a sulfonic acid group, and 2-acid phosphooxyethyl methacrylate having a phosphoric acid.

The amine-modified vinyl unit contained in the vinyl chloride copolymer used in the present invention contains an amino group. The amino group may be either unsubstituted or substituted. The amino groups can be introduced by treating the vinyl chloride copolymers containing the above-mentioned acidic functional group-containing vinyl units with various amines described later. The amine-modified vinyl units may further contain the various functional groups illustrated as the functional groups contained in the above-mentioned acidic functional group-containing vinyl groups.

In the present invention, the content of the amine-modified vinyl units in the above-mentioned copolymer contained in the binder is preferably 0.03% to 2.3% by weight, more preferably 0.05% to 2.0% by weight, and most preferably 0.5% to 1.5% by weight. Too high a content of the amine-modified vinyl units is liable to result in deterioration of the stability of a paint, whereas too low a content thereof tends to results in deterioration of the dispersibility. The content of the acidic functional group-containing vinyl units is preferably 0.05% to 1.8% by weight, more preferably 0.1% to 1.5% by weight, and most preferably 0.5% to 1.5% by weight. Too high a content of the acidic functional group-containing vinyl units is liable to cause an increase in thixotropic properties of a paint, resulting in a reduction in surface smoothness of a magnetic layer coated. On the other hand, too low a content thereof tends to deteriorate the stability of a paint to produce an aggregate, resulting in deterioration of surface properties of a magnetic layer.

The vinyl chloride copolymer having the above-mentioned amine-modified vinyl units and acidic functional group-containing vinyl units in a molecule used in the present invention contains vinyl chloride, a vinyl alkylcarboxylate ester or vinyl alcohol.

Of these constituent units, vinyl acetate is preferably used as the vinyl alkylcarboxylate in respect to the cost of raw materials. Vinyl propionate and vinyl versatate can also be used. Further, vinyl alcohol can be obtained by saponifying an alkylcarboxylic acid moiety of the above-mentioned vinyl alkylcarboxylate ester. The content of the vinyl alkylcarboxylate ester is preferably 0.5% to 10% by weight, and more preferably 1.0% to 5.0% by weight. The content of vinyl alcohol is preferably 0% to 8.0% by weight, and more preferably 3.0% to 6.0% by weight. It is preferred that the remainder excluding these is substantially a vinyl chloride. If the content of the vinyl alkylcarboxylate ester is too high, the affinity for a magnetic powder is liable to be lowered when it is used in a paint, resulting in deterioration of the dispersibility. On the other hand, too low a content thereof tends to cause deterioration of the solubility of the resins. If the content of vinyl alcohol is too high, the saponification rate is increased and likely to cause a reduction in heat stability of the copolymer, leading to deterioration of shelf-stability.

The average degree of polymerization of the copolymer is preferably 200 to 800, and more preferably 300 to 500. Too high a degree of polymerization is liable to deteriorate the solubility and dispersibility of the copolymer, whereas too low a degree of polymerization tends to lower the strength of a magnetic layer to produce scratches on a coated film of the magnetic layer, leading to an increase in dropout.

Such a copolymer may further contain about 0.5% by weight or less of another monomer component such as acrylglycidyl ether or 2-hydroxymethyl methacrylate.

The copolymers used in the present invention may be produced by any procedure. For example, vinyl chloride, a vinyl alkylcarboxylate ester and a monomer having the functional group contained in the acidic functional group-containing vinyl unit illustrated above are copolymerized by suspension polymerization, emulsion polymerization, solution polymerization or bulk polymerization. A copolymer thus obtained, an intermediate product, is saponified in the presence of an alkali such as KOH or NaOH or an acid such as hydrochloric acid or sulfuric acid as a catalyst in an organic solvent such as an alcohol. In this case, an amine compound described later is added, followed by stirring at an appropriate temperature for a definite period of time until a desired saponification rate is obtained to obtain a copolymer. The copolymer thus obtained contains vinyl alcohol.

The amine compounds used in the above-mentioned amine modification include primary, secondary and tertiary amines such as aliphatic amines, alicyclic amines, aromatic amines, alkanol amines and alkoxyalkyl amines. Examples thereof include methylamine, ethylamine, propylamine, butylamine, cyclohexylamine, ethanolamine, naphthylamine, aniline, o-toluidine, diethylamine, dioctylamine, di-isobutylamine, diethanolamine, methylethanolamine, di-methylethanolamine, diethylethanolamine, dibutylethanolamine, 2-methoxyethylamine, N-methylaniline, trimethylamine, triethylamine, triisobutylamine, tridecylamine, N-methylbutylamine, N-methyldiphenylamine, hexamethylenetetramine, triethanolamine, tributylamine, dimethylpropylamine, pyridine, α-picoline, β-picoline, γ-picoline, 2,4-lutidine, quinoline, monoforine, sodium taurinate, potassium sulfanilate, cetylaminesulfonic acid, diaminopropane and hexamethylenediamine. Of these, the aliphatic tertiary amines are most preferred in terms of the excellent dispersibility and stability of a paint.

Examples of the vinyl chloride copolymers having amine-modified vinyl units and acidic functional group-containing vinyl units in a molecule include a vinyl chloride/vinyl acetate/vinyl alcohol/N,N-dimethylethanolamine-modified vinyl unit/maleic acid copolymer (91%/3.0%/5.0%/0.5%/0.5% by weight), a vinyl chloride/vinyl acetate/vinyl alcohol/N,N-dimethylethanolamine-modified vinyl unit/ maleic acid copolymer (91%/3.0%/4.5%/1.0%/0.5% by weight), a vinyl chloride/vinyl acetate/vinyl alcohol/N,N-dimethylethanolamine-modified vinyl unit/maleic acid copolymer (91%/3.0%/4.0%/1.5%/0.5% by weight), a vinyl chloride/vinyl acetate/vinyl alcohol/N,N-dimethylethanolamine-modified vinyl unit/maleic acid copolymer (91%/3.0%/4.5%/0.5%/1.0% by weight), a vinyl chloride/vinyl acetate/vinyl alcohol/N,N-dimethylethanolamine-modified vinyl unit/maleic acid copolymer (91%/3.0%/4.0%/0.5%/1.5% by weight), a vinyl chloride/vinyl acetate/vinyl alcohol/N,N-dimethylethanolamine-modified vinyl unit/sodium methacrylsulfonate copolymer (91%/3.0%/5.0%/0.5%/0.5% by weight), a vinyl chloride/vinyl acetate/vinyl alcohol/N,N-dimethylethanolamine-modified vinyl unit/2-acid phosphooxyethyl methacrylate copolymer (91%/3.0%/5.0%/0.5%/0.5% by weight), a vinyl chloride/vinyl acetate/vinyl alcohol/methylamine-modified vinyl unit/maleic acid copolymer (91%/3.0%/5.0%/ 0.5%/0.5% by weight) and a vinyl chloride/vinyl acetate/vinyl alcohol/dimethylamine-modified vinyl unit/maleic acid copolymer (91%/3.0%/5.0%/0.5%/0.5% by weight).

A magnetic paint improved in the dispersibility and stability of the paint can be obtained by containing such a copolymer in the binder. Even if a mixture of a copolymer having the amine-modified vinyl units and a copolymer having the acidic functional group-containing vinyl units is used in place of the above-mentioned copolymer having both the amine-modified vinyl units and the acidic functional group-containing vinyl units in a molecule, an effect equivalent to that obtained for the above-mentioned copolymer used in the present invention can not be obtained.

The vinyl chloride copolymer having the amine-modified vinyl units and the acidic functional group-containing vinyl units is contained in an amount of 20% to 80% by weight based on the total amount of the binder. Less than 20% by weight reduces the strength of a coated film to deteriorate the running stability, resulting in a tendency to cause troubles during running, whereas exceeding 80% by weight lowers the calendaring processability which is liable to deteriorate the electromagnetic characteristics.

In the present invention, the binder contained in the magnetic layer comprises polyurethane resin 1 having a number average molecular weight (Mn) of 5000 to 25000 (Mn 1), preferably 8000 to 23000, and polyurethane resin 2 having a number average molecular weight of less than 25000 to 100000 (Mn 2), preferably 30000 to 80000, as essential ingredients.

In the present invention, the inclusion of polyurethane resin 1 having the above-mentioned Mn 1 improves the dispersibility of the magnetic paint to obtain the excellent electromagnetic characteristics. Further, the inclusion of polyurethane resin 2 having the above-mentioned Mn 2 improves the strength of a coated film, and reduces powder falling and head adhesion to obtain the excellent running durability.

Too low an Mn 1 of polyurethane resin 1 deteriorates the dispersibility of the magnetic paint. Further, the strength of the coated film is decreased to deteriorate the running stability, resulting in a tendency to cause troubles during running. On the other hand, too high an Mn 1 tends to deteriorate the dispersibility of the magnetic paint, which causes deterioration of the electromagnetic characteristics.

Too low an Mn 2 of polyurethane resin 2 deteriorates the running stability, resulting in a tendency to cause troubles during running, whereas too high an Mn 2 deteriorates the dispersibility of the magnetic paint, resulting in deterioration of the electromagnetic characteristics such as reproduction output.

The content of polyurethane resin 1 described above is 10% to 50% by weight based on the binder, and preferably 15% to 45% by weight. The content of polyurethane resin 2 is 10% to 50% by weight based on the binder, and preferably 15% to 45% by weight.

Too high a content of polyurethane resin 1 in the binder decreases the strength of the coated film to deteriorate the running stability, resulting in a tendency to cause troubles during running, whereas too low a content deteriorates the dispersibility of the magnetic paint which is liable to deteriorate the electromagnetic characteristics.

Too high a content of polyurethane resin 2 in the binder deteriorates the dispersibility of the magnetic paint, which tends to result in deterioration of the electromagnetic characteristics, whereas too low a content lowers the strength of the coated film which is liable to deteriorate the running stability.

The glass transition temperature (Tg) of polyurethane resin 1 and polyurethane resin 2 used is preferably $-50°$ C. to $+80°$ C., and more preferably $-40°$ C. to $+80°$ C. Too low a glass transition temperature deteriorates the running durability under the circumstances of high temperature, resulting in a tendency to cause troubles such as head clogging and guide adhesion during running, whereas too high a glass transition temperature deteriorates the calendaring processability to tend to deteriorate the electromagnetic characteristics. Further, the running durability under the circumstances of low temperature is deteriorated.

The glass transition temperature (Tg) of these resins may be measured with a dynamic viscoelasticity measuring device.

Further, the total amount of polyurethane resin 1 and polyurethane resin 2 is preferably 20% to 80% by weight based on the binder used, and particularly preferably 30% to 80% by weight. The compounding ratio (weight ratio) of polyurethane resin 1 to polyurethane resin 2 is preferably 1:5 to 5:1.

If the total content of polyurethane resin 1 and polyurethane resin 2 in the binder is too low, the running stability is liable to be deteriorated, or the calendaring processability is deteriorated to roughen a surface of a magnetic layer, resulting in a tendency to deteriorate the electromagnetic characteristics such as reproducing output. As polyurethane resins used as polyurethane resin 1 and polyurethane resin 2, any polyurethane resins may be used as long as they are polyurethane resins usually employed in such magnetic recording media and satisfies the above-mentioned number average molecular weight.

For example, the polyurethane resins are obtained by reacting polyols such as polyesterpolyols, polyetherpolyols, polycarbonatepolyols, polyesterpolycarbonates, polyesterpolyethers and polycaprolactones with isocyanates, together with chain extenders and others if desired.

In order to improve the dispersibility of a powder ingredient such as a ferromagnetic powder contained in a magnetic layer and the running durability of the magnetic layer, it is preferred that polyurethane resin 1 and/or polyurethane resin 2 contains at least one polar group in a molecule thereof.

In this case, at least one polar group selected from hydrophilic functional groups such as $-SO_3M$, $-SO_4M$, $=PO_3M$, $=POM$, $-P=O(OM)_2$, $-OP=O(OM)_2$, $-COOM$, $-NR_3X$, $-NR_2$, $-N^+R_3$, an epoxy group, $-OH$, $-SH$ and $-CN$ (wherein X represents H, Li, Na, K or $-NR_3$, R represents an alkyl group or H, and X represents a halogen atom) is preferably introduced by copolymerization or the addition reaction. The introduction of such groups improves the dispersibility of the paint, resulting in an improvement in the characteristics of the magnetic recording medium. These polar groups may exist either in main chains or in branched chains of skeleton resins.

Particularly preferred examples of the polar groups include sulfonic acid groups ($-SO_3M$), carboxylic acid groups (—COOM) and phosphonic acid groups (=PO$_3$M). These polar groups are preferably contained in an amount of about 0.1 to about 5 molecules per molecule of polyurethane polymer.

The polyurethane resins used in the present invention are ones obtained by reacting organic diisocyanates (A) with long-chain diols having a molecular weight of 500 to 5000 (B) in the presence of chain extenders having a molecular weight of less than 500 (C).

The organic diisocyanates (A) used in the production of the polyurethanes include 2,4-tolylene diisocyanate, 2,6-tolylene diisocyanate, p-phenylene diisocyanate, diphenylmethane diisocyanate, m-phenylene diisocyanate, hexamethylene diisocyanate, tetramethylene diisocyanate, 3,3'-dimethoxy-4,4'-biphenylene diisocyanate, 2,4-naphthalene diisocyanate, 3,3'-dimethyl-4,4'-biphenylene diisocyanate, 4,4'-diphenylene diisocyanate, 4,4'-diisocyanate diphenyl ether, 1,5-naphthalene diisocyanate, p-xylylene diisocyanate, m-xylylene diisocyanate, 1,3-diisocyanate methylcyclohexane, 1,4-diisocyanate methylcyclohexane, 4,4'-diisocyanate cyclohexane, 4,4'-diisocyanate cyclohexylmethane and isophorone diisocyanate.

The long-chain diols (B) used in the production of the polyurethane resins have a molecular weight ranging from 500 to 5000, and include polyesterdiols, polyetherdiols and polycarbonatediols.

Carboxylic acid ingredients of the polyesterdiols include aromatic dicarboxylic acids such as terephthalic acid, isophthalic acid, orthophthalic acid and 1,5-naphthalic acid, aromatic oxycarboxylic acids such as p-oxybenzoic acid and p-(hydroxyethoxy)benzoic acid, and aliphatic dicarboxylic acids such as succinic acid, adipic acid, azelaic acid, sebacic acid and dodecanedicarboxylic acid. In particular, terephthalic acid, isophthalic acid, orthophthalic acid, adipic acid and sebacic acid are preferred.

Further, glycol ingredients of the polyesterdiols include ethylene glycol, propylene glycol, 1,3-propanediol, 1,4-butanediol, 1,5-pentanediol, 1,6-hexanediol, neopentyl glycol, diethylene glycol, dipropylene glycol, 2,2,4-trimethyl-1,3-pentanediol, cyclohexanedimethanol, ethylene oxide adducts and propylene oxide adducts of bisphenol A, and ethylene oxide adducts and propylene oxide adducts of bisphenol A hydride.

In addition, the polyesterdiols include lactone polyesterdiols obtained by ring-opening polymerization of lactones such as ε-caprolactone.

The polyetherdiols include polyalkylene glycols such as polyethylene glycol, polypropylene glycol and polytetramethylene glycol.

The polycarbonatediols are long-chain diols represented by general formula H—(O—R—OCO)$_n$—ROH, wherein R is a residue of diethylene glycol, 1,4-butanediol, 1,6-hexanediol or bisphenol A.

The long-chain diols (B) are preferably the polyester-diols for enhancing the mechanical characteristics of the polyurethane resins. The long-chain diols used have a molecular weight of 500 to 5000. If the molecular weight is less than 500, the concentration of urethane groups is increased, resulting in a reduction in flexibility and solvent solubility of the resins. On the other hand, if the molecular weight exceeds 5000, the concentration of urethane groups is decreased to deteriorate toughness and wear resistance characteristic of the polyurethane resins.

Each of the chain extenders having a molecular weight of less than 500 (C) used in the production of the polyurethane resins contains two active hydrogens in one molecule, and has the effect of adjusting the concentration of urethane groups or urea groups contained in the resins to give the toughness characteristic of the polyurethane resins. Examples of such compounds include straight chain glycols such as ethylene glycol, 1,3-propylene glycol, 1,4-butanediol, 1,6-hexanediol, cyclohexanedimethanol, xylylene glycol, diethylene glycol, triethylene glycol and ethylene oxide adducts of bisphenol A, branched glycols such as propylene glycol, neopentyl glycol, 1,2-butanediol, 1,3-butanediol, 2,2,4-trimethyl-1,3-pentanediol and propylene oxide adducts of bisphenol A, aminoalcohols such as monoethanolamine and N-methylethanolamine, diamines such as ethylenediamines, hexamethylenediamine and isophoronediamine, and water.

The polyurethane resins include, for example, the polyesterpolyurethane resins, the polyetherpolyurethane resins and the polycarbonatepolyurethane resins. Of these, the polyesterpolyurethane resins are preferred. The polyesterpolyurethane resins are preferably reaction products of polyesterdiol (1)/polyesterdiol (2)/neopentyl glycol/4,4'-diphenylmethane diisocyanate. Polyesterdiol (1) is composed of, for example, terephthalic acid/isophthalic acid/5-sodiumsulfoisophthalic acid/ethylene glycol/neopentyl glycol in a molar ratio of 49/49/2/50/50, and polyesterdiol (2) is composed of, for example, adipic acid/1,4-butanediol/neopentyl glycol in a molar ratio of 100/75/25. The Tg is arbitrarily controllable by adjusting the mixing ratio of polyesterdiol (1) to polyesterdiol (2) and the concentration of urethane groups.

Examples of the polyetherpolyurethane resins include reaction products of polyalkylene glycols/neopentyl glycol/4,4'-diphenylmethane diisocyanate, and the polyalkylene glycols include polyethylene glycol, polypropylene glycol and polytetramethylene glycol.

Examples of the polycarbonatepolyurethane resins include reaction products of polycarbonatediols/neopentyl glycol/4,4'-diphenylmethane diisocyanate, and the polycarbonatediols include a reaction product of diethyl carbonate/1,6-hexanediol and a reaction product of diethyl carbonate/ethylene glycol.

The amount of the binder used in a magnetic layer is preferably 5 parts to 40 parts by weight per 100 parts by weight of ferromagnetic powder, and particularly preferably 10 parts to 30 parts by weight. If the content of the binder is too low, the strength of the magnetic layer is lowered, resulting in a tendency to deteriorate the running durability. On the other hand, if it is too high, the content of the ferromagnetic powder is decreased to deteriorate the electromagnetic characteristics.

As crosslinking agents for curing these binders, various polyisocyanates, particularly diisocyanates, can be used, and particularly at least one of tolylene diisocyanate, hexamethylene diisocyanate and methylene diisocyanate is preferred. It is particularly preferred to use these crosslinking agents as crosslinking agents modified to compounds each having a plurality of hydroxyl groups such as trimethylolpropane, or isocyanulate type crosslinking agents in each of which three diisocyanate compounds are linked together. The crosslinking agents combine with functional groups contained in the binder resins to crosslink the resins. The content of the crosslinking agent is preferably 10 parts to 30 parts by weight per 100 parts by weight of binder. In order to cure such thermosetting resins, they may be generally heated in a heating oven at 50° C. to 70° C. for 12 hours to 48 hours.

Examples of the ferromagnetic powders used in the present invention include iron oxide magnetic powders such as Co compound-coated or dope type $\gamma$—$Fe_2O_3$, Co compound-coated or dope type $Fe_3O_4$ and Co compound-coated or dope type bertholide, ferromagnetic iron or alloy powders mainly composed of ferromagnetic metal elements such as $\alpha$—Fe, Fe—Co, Fe—Ni, Fe—Co—Ni, Co and Co—Ni, $CrO_2$ magnetic powders and tabular hexagonal ferrite powders having axes of easy magnetization perpendicular to flat plates.

Al, Si, P, Y and rare earth elements can be added to the above-mentioned ferromagnetic powders to prevent sintering and to improve the particle-size distribution, resulting in an improvement in the electromagnetic characteristics of the magnetic recording media. In the production of the ferromagnetic powders, surfaces thereof may be coated with Al, Si, P or oxide films thereof, or may be treated with coupling agents such as Si, Al and Ti or various surfactants after the production of the ferromagnetic powders, thereby improving the dispersibility of the magnetic paints and the durability of the magnetic recording media.

Lubricants, abrasives, non-ferromagnetic pigments, carbon black and organic pigments may be added to the magnetic paints used in the present invention. Further, additives having the lubricating effect, the antistatic effect, the dispersing effect or the plasticizing effect are used, and silicone oils, fluorine oils, cationic surfactants, nonionic surfactants, anionic surfactants or amphoteric surfactants can also be used.

Of various known lubricants, fatty acids and/or fatty acid esters are preferably used as the lubricants in the present invention. The fatty acids include monobasic fatty acids each having 12 to 24 carbon atoms. The fatty acid esters include fatty acid monoesters, fatty acid diesters and fatty acid triesters synthesized from monobasic fatty acids each having 10 to 24 carbon atoms and cyclic or polysaccharide-reduced alcohols prepared from monohydric to hexahydric alcohols each having 2 to 22 carbon atoms, and mixtures thereof. Two or more of them may be used in combination. Hydrocarbon groups of these fatty acids and fatty acid esters may contain unsaturated bonds or may be branched. Further, the lubricants are preferably added to backcoat layers or undercoat layers, in addition to the magnetic layers. In particular, when the magnetic layers are thin, addition of the lubricants to the undercoat layers is effective for an improvement in still durability. Further, when the backcoat layers are provided, the lubricants can be added in a larger amount to the backcoat layers to improve the surface lubricity of the magnetic layers by transfer to surfaces thereof.

The abrasives and the non-magnetic pigments which can be used in the present invention include $\alpha$-alumina, $\gamma$-alumina, $\theta$-alumina, dichromium trioxide, $\alpha$-iron oxide, $SiO_2$, ZnO, $TiO_2$, silicon carbide, calcium carbonate and barium sulfate. Although any form and size of particles of these pigments may be used, the particle form is preferably spherical or polyhedral, and the particle size is preferably 0.01 $\mu$m to 0.7 $\mu$m. They may be suitably selected according to a balance between the durability and friction coefficient required for the magnetic recording media and the output at the shortest recording wavelength, and may be selected in a single system or in a mixed system. The particle-size distribution can also be selected independently. These inorganic compounds may be suitably used in combination depending on desired characteristics of the magnetic layers, the backcoat layers and the undercoat layers.

As the carbon black which can be used in the present invention, furnace carbon black, thermal carbon black and acetylene black can be used alone or in combination. Further, surfaces of the carbon black particles may be treated with lubricants or dispersing agents, or partially graphitized. Any size of these carbon black particles may be used, or suitably selected according to a balance between the durability and friction characteristics required for the magnetic recording media and the output at the shortest recording wavelength (surface roughness), and may be selected in a single system or in a mixed system. The particle-size distribution can also be selected independently. The carbon black may be suitably used in combination depending on desired characteristics of the magnetic layers, the backcoat layers and the undercoat layers.

The non-magnetic organic powders used in the present invention, organic pigments, include acrylstyrene resin powders, benzoguanamine resin powders, melamine resin powders, phthalocyanine pigments, polyolefin resin powders, polyester resin powders, polyamide resin powders, polyimide resin powders, hydrocarbon fluoride resin powders and divinylbenzene resin powders.

These organic compounds may be suitably used in combination depending on desired characteristics of the magnetic layers, the backcoat layers and the undercoat layers.

Examples of solvents used in the present invention include ketones such as methyl ethyl ketone, methyl isobutyl ketone and cyclohexanone, aromatic hydrocarbons such as toluene and xylene, esters such as ethyl acetate and butyl acetate, and diluents or solvents such as dioxane, tetrahydrofurane, dimethylformamide and hexane. They may be used as a single solvent or as mixed solvents with any mixing ratio.

In the present invention, the backcoat layers may be provided.

The backcoat layers are provided for an improvement in the running stability or prevention of static charge. The backcoat layer preferably contains 30% to 80% by weight of carbon black. Too low a content of the carbon black tends to decrease the antistatic effect, and is further liable to deteriorate the running stability. In addition, the light transmission rate is liable to become high, so that a problem arises in a system of detecting a tape edge by changes in the light transmission rate. On the other hand, too much a content of the carbon black reduces the strength of the backcoat layer, resulting in a tendency to deteriorate the running durability. The carbon black may be any as long as it is usually employed, and the average particle size thereof is preferably about 5 nm to about 500 nm. The average particle size is usually measured with a transmission electron microscope.

The backcoat layers may contain non-magnetic inorganic powders such as the various abrasives described above with respect to the magnetic layers, in addition to the above-mentioned carbon black, in order to enhance the mechanical strength. The content of the non-magnetic inorganic powder is preferably 0.1 to 5 parts by weight per 100 parts by weight of carbon black, and more preferably 0.5 to 2 parts by weight. The average particle size of the non-magnetic inorganic powder is preferably 0.1 $\mu$m to 0.5 $\mu$m. Too low a content of such a non-magnetic inorganic powder is liable to make the mechanical strength of the backcoat layer insufficient, whereas too high a content tends to increase the abrasion of a guide in a tape sliding path.

Besides, dispersing agents such as surfactants, lubricants such as higher fatty acids, fatty acid esters and silicone oil, and other various additives may be added if necessary.

Binders, crosslinking agents and solvents used in the backcoat layers may be the same as those used in the above-mentioned paints for magnetic layers. The content of the binder is preferably 15 parts to 200 parts by weight per 100 parts by weight of the total solid content, and more preferably 50 parts to 180 parts by weight. Too high a content of the binder increases friction between the magnetic recording medium and a sliding path thereof in excess to deteriorate the running stability, resulting in a tendency to bring about running trouble. The problem of blocking with the magnetic layer is further encountered. Too low a content of the binder lowers the strength of the backcoat layer to be liable to deteriorate the running durability.

The thickness of the backcoat layer (after calendaring treatment) is 1.0 µm or less, preferably 0.1 µm to 1.0 µm, and more preferably 0.2 µm to 0.8 µm. Too thick a thickness of the backcoat layer increases friction between the magnetic recording medium and a sliding path thereof in excess to tend to deteriorate the running stability, whereas too thin a thickness deteriorates the surface properties of the backcoat layer, affected by the surface properties of the magnetic recording medium. Accordingly, when the backcoat layer is thermoset, the roughness on the surface of the backcoat layer is transferred to the surface of the magnetic recording medium to cause decreases in high frequency output, S/N and C/N. On the other hand, if the backcoat layer is too thin, scratches are produced on the backcoat layer in running of the magnetic recording medium.

Supports used in the present invention include polyethylene terephthalate (PET), polyethylene naphthalate (PEN), polyamide, polyimide and polyamideimide films containing inorganic compounds such as oxides and carbonates of Al, Ca, Si and Ti, and organic compounds such as fine acrylic resin powders as fillers. Of these, the PET, PEN and aromatic polyamide films are preferred, and composite films produced by multilayer coextrusion of two or three kinds of PET and PEN are more preferred. Further, the supports may previously be subjected to corona discharge treatment, plasma discharge treatment and/or polymerization treatment, coating treatment of adhesion improving agents, dustproof treatment, and relaxation treatment by heat and/or humidification.

In the present invention, the support may be provided with the magnetic layer on one surface, or with magnetic layers on both surfaces, or with multiple magnetic layers. In particular, when provided with the magnetic layer only on one surface, the support is preferably provided with the backcoat layer on the surface opposite to the magnetic layer. The undercoat layer composed of the non-ferromagnetic material may be formed under the magnetic layer for improving the surface properties, the adhesive properties and the durability. Further, a protective lubricating layer such as a lubricant, a plasma-polymerized film or a diamond-like film may be formed on the magnetic layer for lubricating and protecting the magnetic layer.

Manufacturing Processes of Paints

Processes for manufacturing the magnetic paints of the magnetic recording media of the present invention and the paints for forming the magnetic recording media (backcoat paints and undercoat paints) each comprise at least kneading steps, dispersing steps, filtering steps, optional mixing steps given before or after these steps, and storing steps. In the kneading steps, devices having strong kneading ability such as continuous kneaders, pressure kneaders, high-speed mixers and two-roll mills are used, and all or a part of the pigment powders and the binders are kneaded. Further, in dispersion of the paints, zirconia or glass beads can be used. In the dispersing steps, dilution dispersion is used in combination so that the solid concentration is gradually decreased. The individual steps may be each divided into two or more stages, and raw materials may be added in lots at two or more stages.

The filtering steps of the paints are preferably provided after each production of the respective paints. If magnetic powders not dispersed or coagulated, or resins not dissolved exist in the magnetic paints, they become defects in the magnetic paints, which causes increases in dropout and in error rate. A main object of the filtering stages is to remove these contaminants in the magnetic paints. Details thereof are described in Japanese Patent Application No. 6-321357 previously proposed by the present inventors.

Coating Processes

Elongated film-like non-magnetic supports drawn out of unwind rolls are coated with the paints while incorporating hardeners therein (or in which hardeners have been incorporated) as required, said paints having been filtered through filters having specified filtering precision, by various known coating means such as gravure coating, reverse roll coating and extrusion nozzle coating.

In general, before coating of these coatings, the non-magnetic supports are treated by various known means such as wet cleaning using water or solvents, dry cleaning using nonwoven fabrics or ultrafine fiber woven fabrics as wipers, and non-contact cleaning using compressed air, vacuum or ionized air, for cleaning and surface adjustment. Further, they are subjected to various known non-contact surface treatments such as corona discharge, ultraviolet light irradiation and electron beam irradiation, for improving adhesion of the paints to the non-magnetic supports and improving coating surfaces.

Further, the non-magnetic supports may be coated with undercoating agents such as aqueous undercoating agents, emulsion undercoating agents and solvent undercoating agents independently or together with the above-mentioned surface treatments for improving adhesion in some cases. Technically, in place of the undercoat layers consisting of resins alone, paints in which non-ferromagnetic inorganic or organic pigments are dispersed in binders may be applied as the undercoat layers, and may be used in combination with the above-mentioned surface treatments. The plural undercoat layers may be preferably formed at the same time by the wet-on-wet coating process according to extrusion nozzle coating as long as they are not abnormally separated or not repelled from the magnetic layers or the backcoat layers.

Although the magnetic layer is generally formed independently, it is also possible to provide two or more magnetic layers for giving higher functions. In that case, the magnetic layers and the non-ferromagnetic layers may be formed by known methods such as the wet-on-dry coating process and the wet-on-wet coating process.

After such a coating process, various treatments such as smoothing of wet film surfaces of the magnetic paints formed on the non-magnetic supports and coated film regulation may be usually conducted. As smoothing means, known processes can be employed such as contact processes using films or bars of resins, metals or ceramics and non-contact processes using vibration caused by magnetic fields or ultrasonic waves generated with permanent magnets or electromagnets. They may be used alone or in combination depending on desired characteristics.

Orientation Processes

After formation of the magnetic layers, it is necessary to orient the magnetic particles in the layers by application of magnetic fields. The orientation direction thereof may be longitudinal, vertical or oblique to the running direction of the magnetic recording media. In order to orient the magnetic particles in the specified direction, it is preferred to apply a magnetic field of 1000 G or more in the specified direction with a permanent magnet such as a ferrite magnet or a rare earth magnet, an electromagnet or a solenoid, or to use these plural magnetic field generating means in combination. Further, proper drying may be conducted before the orientation or simultaneously therewith so that the highest orientation is obtained after the orientation. In the case of floppy disks, the orientation of the magnetic powders naturally orientated by coating may be reduced as low as possible with a permanent magnet, an electromagnet or a solenoid.

Drying Processes

The magnetic paints thus treated after coating are dried and fixed by known drying and evaporating means such as hot air, far infrared rays, electric heaters and vacuum evaporators usually mounted in drying furnaces, or known curing devices such as ultraviolet lamps and radiation irradiation devices.

The drying temperature ranges from room temperature to 300° C., and may be suitably selected depending on the heat resistance of the non-magnetic supports, and the kind and the concentration of solvents. Further, the temperature gradient may be given into the drying furnaces, and the gas atmospheres in the drying furnaces may be general air or inert gases.

Drying with ultraviolet lamps or radiation irradiation devices causes the curing reaction. Considering the after treatment, therefore, other drying means are preferably used as much as possible.

Irradiation of ultraviolet rays or radiation with solvents contained is sometimes accompanied by ignition or smoking. Accordingly, also in this case, other drying means may be used in combination as much as possible.

Calendaring Processes

After drying of the magnetic layers like this, calendaring treatment is carried out as surface smoothing treatment if necessary. Calendaring rolls include combinations (3 to 7 stages) of metal rolls and heat-resistant plastic rolls made of epoxy resins, polyesters, nylon, polyimides, polyamides and polyimideamides (in which inorganic compounds such as carbon and metals may be kneaded), and combinations of metal rolls. The treating temperature is preferably 70° C. or more, and more preferably 80° C. or more. The linear pressure is preferably 200 kg/cm or more, and more preferably 300 kg/cm or more. The speed ranges from 20 m/minute to 700 m/minute.

After Treatment

After the calendaring treatment, thermosetting treatment at 40° C. to 80° C. and/or electron beam irradiation treatment may be applied in order to enhance curing of the magnetic layers, the backcoat layers and the non-ferromagnetic layers.

Then, formation of tapes or disks of specified shape with slitters or pressing machines is followed by secondary processing such as grinding or cleaning on magnetic surfaces and/or backcoat surfaces to prepare magnetic recording media.

The present invention will be further illustrated with reference to the following examples, which are, however, not to be construed as limiting the invention.

The characteristics of the magnetic tapes were measured by the following methods.

Gloss

The gloss (%) at a measurement angle of 60° was measured with a GM-3D digital gloss meter manufactured by Murakami Shikisai Gijutsu Kenkyusho. The optical conditions described in JIS-Z-8741 were employed.

Electromagnetic Characteristics

7 MHz Output

A 7-MHz signal was recorded on a tape sample, and when this signal was reproduced, a 7-MHz reproduced output was measured with an oscilloscope as a relative value taking the 7-MHz output of Comparative Example 7 as 0 dB.

Y-C/N

A 7-MHz signal was recorded on a tape sample, and when this signal was reproduced, a noise generated at 6 MHz was measured with a spectrum analyzer to determine the ratio of the reproduced signal to this noise as a relative value taking the Y-C/N of Comparative Example 8 as 0 dB.

Deck Used: BR-S711 (S-VHS format VTR) manufactured by JVC Co.

Running Durability

The shuttle running of a tape sample was repeated 100 times for 50 reels on a VTR under the circumstances of 20° C. and 60% RH, and the occurrence of running troubles such as running stoppage and head clogging were observed to evaluate the running durability based on the following criterion.

Deck Used: BR-S711 (S-VHS format VTR) manufactured by JVC Co.

O: No troubles occurred.

Δ: Troubles occurred for one reel.

x: Troubles occurred for two or more reels.

Still Durability

Each tape sample was reproduced in the still mode, and the time taken to reduce a 7-MHz reproduced output by 6 dB was measured.

Deck Used: BR-S711 (S-VHS format VTR) manufactured by JVC Co.

EXAMPLES 1 TO 17 AND COMPARATIVE EXAMPLES 1 TO 7

Production of Vinyl Chloride Copolymers (1) Production of Vinyl Chloride-Vinyl Acetate-Vinyl Alcohol-N,N-Dimethylethanolamine-Modified Vinyl Unit-Maleic Acid Copolymer An autoclave equipped with a stirrer was charged with methanol, vinyl chloride, vinyl acetate, maleic acid, di(2-ethylhexyl)peroxydicarbonate and partially saponified polyvinyl alcohol, and the temperature was elevated to 60° C. with stirring under an atmosphere of nitrogen gas to initiate the reaction, followed by further continuous injection of vinyl chloride to conduct the copolymerization reaction. After release of the residual pressure of the autoclave and cooling, a copolymer slurry was taken out and filtered, followed by washing with methanol three times and further with deionized water twice, thus obtaining a vinyl chloride-vinyl acetate-maleic acid copolymer powder. This copolymer, methanol, N,N-dimethylethanolamine and sodium hydroxide were added to a reactor equipped with a cooling pipe, and allowed to react at 40° C. Then, the reaction product was cooled, and acetic acid was added thereto to neutralize unreacted sodium hydroxide. The resulting product was washed with methanol three times and further with deionized water twice, followed by filtering and drying to obtain a vinyl chloride-vinyl acetate-vinyl alcohol-maleic acid-N,N-dimethylethanolamine-modified vinyl unit copolymer powder. Copolymers different in weight ratio of monomers shown in Table 1 were produced by changing the amounts of the respective monomer units or amine compounds.

(2) Production of Vinyl Chloride-Vinyl Acetate-Vinyl Alcohol-N,N-Dimethylethanolamine-Modified Vinyl Unit-Sodium Methacrylsulfonate Copolymer In the above-mentioned process (1), sodium methacrylsulfonate was used instead of maleic acid to produce a copolymer.

(3) Production of Vinyl Chloride-Vinyl Acetate-Vinyl Alcohol-N,N-Dimethylethanolamine-Modified Vinyl Unit-2-Acid Phosphooxyethyl Methacrylate Copolymer In the above-mentioned process (1), 2-acid phosphooxyethyl methacrylate was used instead of maleic acid to produce a copolymer.

(4) Production of Vinyl Chloride-Vinyl Acetate-Vinyl Alcohol Copolymer

An autoclave equipped with a stirrer was charged with methanol, vinyl chloride, vinyl acetate, di(2-ethylhexyl) peroxydicarbonate and partially saponified polyvinyl alcohol, and the temperature was elevated to 60° C. with stirring under an atmosphere of nitrogen gas to initiate the reaction, followed by further continuous injection of vinyl chloride to conduct the copolymerization reaction. After release of the residual pressure of the autoclave and cooling, a copolymer slurry was taken out and filtered, followed by washing with methanol three times and further with deionized water twice. Then, the resulting product was filtered and dried to obtain a vinyl chloride-vinyl acetate copolymer powder. This copolymer, methanol and sodium hydroxide were added to a reactor equipped with a cooling pipe, and allowed to react at 40° C. Then, the reaction product was cooled, and acetic acid was added thereto to neutralize unreacted sodium hydroxide. The resulting product was washed with methanol three times and further with deionized water twice, followed by filtering and drying to obtain a vinyl chloride-vinyl acetate-vinyl alcohol copolymer powder.

(5) Production of Vinyl Chloride-Vinyl Acetate-Vinyl Alcohol-Maleic Acid Copolymer An autoclave equipped with a stirrer was charged with methanol, vinyl chloride, vinyl acetate, maleic acid, di(2-ethylhexyl)peroxydicarbonate and partially saponified polyvinyl alcohol, and the temperature was elevated to 60° C. with stirring under an atmosphere of nitrogen gas to initiate the reaction, followed by further continuous injection of vinyl chloride to conduct the copolymerization reaction. After release of the residual pressure of the autoclave and cooling, a copolymer slurry was taken out and filtered, followed by washing with methanol three times and further with deionized water twice. Then, the resulting product was filtered and dried to obtain a vinyl chloride-vinyl acetate-maleic acid copolymer powder. This copolymer, methanol and sodium hydroxide were added to a reactor equipped with a cooling pipe, and allowed to react at 40° C. Then, the reaction product was cooled, and acetic acid was added thereto to neutralize unreacted sodium hydroxide. The resulting product was washed with methanol three times and further with deionized water twice, followed by filtering and drying to obtain a vinyl chloride-vinyl acetate-vinyl alcohol-maleic acid copolymer powder.

(6) Production of Vinyl Chloride-Vinyl Acetate-Vinyl Alcohol-N,N-Dimethylethanolamine-Modified Vinyl Unit Copolymer An autoclave equipped with a stirrer was charged with methanol, vinyl chloride, vinyl acetate, di(2-ethylhexyl) peroxydicarbonate and partially saponified polyvinyl alcohol, and the temperature was elevated to 60° C. with stirring under an atmosphere of nitrogen gas to initiate the reaction, followed by further continuous injection of vinyl chloride to conduct the copolymerization reaction. After release of the residual pressure of the autoclave and cooling, a copolymer slurry was taken out and filtered, followed by washing with methanol three times and further with deionized water twice. Then, the resulting product was filtered and dried to obtain a vinyl chloride-vinyl acetate copolymer powder. This copolymer, methanol, N,N-dimethylethanolamine and sodium hydroxide were added to a reactor equipped with a cooling pipe, and allowed to react at 40° C. Then, the reaction product was cooled, and acetic acid was added thereto to neutralize unreacted sodium hydroxide. The resulting product was washed with methanol three times and further with deionized water twice, followed by filtering and drying to obtain a vinyl chloride-vinyl acetate-vinyl alcohol-N,N-dimethylethanolamine-modified vinyl unit copolymer powder.

Production of Polyesterpolyurethane Resins

Dimethyl terephthalate, dimethyl isophthalate, dimethyl 5-sodiumsulfoisophthalate, ethylene glycol, neopentyl glycol, zinc acetate and sodium acetate were placed in a reactor equipped with a thermometer, a stirrer and a partial reflux condenser, and transesterification was conducted at 140° C. to 220° C. for 3 hours. Then, the reaction system was evacuated to 5 mm Hg for 20 minutes, and the temperature thereof was elevated to 250° C. in the meantime. Further, the polycondensation reaction was conducted at 250° C. at 0.1 mm Hg for 60 minutes to obtain polyesterdiol (1), which had the composition of terephthalic acid/isophthalic acid/5-sodiumsulfoisophthalic acid/ethylene glycol/neopentyl glycol in a molar ratio of 49/49/2/50/50. In a similar manner, polyesterdiol (2) was obtained. The composition thereof was adipic acid/1,4-butanediol/neopentyl glycol in a molar ratio of 100/75/25.

Toluene, methyl isobutyl ketone, polyesterdiol (1), polyesterdiol (2), 4,4'-diphenylmethane diisocyanate, neopentyl glycol and dibutyltin dilaurylate were placed in a reactor equipped with a thermometer, a stirrer and a partial reflux condenser, and allowed to react at 70° C. to 90° C. for 8 hours to obtain polyesterpolyurethane resin 1 and polyesterpolyurethane resin 2 having molecular weights shown in Table 1.

Preparation of Magnetic Paints

| Preparation of Binder Solutions | |
|---|---|
| Vinyl chloride copolymer (vinyl chloride-vinyl acetate-vinyl alcohol-N,N-dimethylethanolamine-modified vinyl unit-maleic acid copolymer, monomer weight ratio: shown in Table 1, average degree of polymerization: shown in Table 1 | 50 parts |
| Polyesterpolyurethane resin 1 (containing —SO$_3$Na groups, Mn: shown in Table, Tg: 20° C.) | 20 parts |
| Polyesterpolyurethane resin 2 (containing —SO$_3$Na groups, Mn: shown in Table, Tg: 20° C.) | 30 parts |
| Methyl ethyl ketone (MEK) | 200 parts |
| Toluene | 100 parts |
| Cyclohexane | 100 parts |

The above-mentioned compositions were placed in an agitator, and mixed by stirring for 6 hours to form a binder solution. The above-mentioned binder solution was filtered by circulation through a Depth type filter having a 95% cut filtration accuracy of 5.0 μm for 8 hours.

| Kneading-Dispersing Treatment | |
|---|---|
| Co-coated iron oxide magnetic powder (Hc: 8000e, δs: 70 emu/g, specific surface area: 45 m$^2$/g) | 700 parts |
| α-Al$_2$O$_3$ (HIT-50 manufactured by Sumitomo Chemical Co, Ltd.) | 35 parts |
| Cr$_2$O$_3$ (U-1 manufactured by Nippon Chemical Industrial Co., Ltd.) | 35 parts |
| Binder solution | 250 parts |

The above-mentioned compositions were placed in a pressure kneader, and kneaded for 2 hours. After kneading, the following compositions were added thereto to adjust the viscosity to the optimum for dispersing treatment.

| Binder solution | 250 parts |
|---|---|
| MEK | 200 parts |
| Toluene | 200 parts |
| Cyclohexane | 200 parts |

After mixing treatment, dispersing treatment was performed in a sand mill.

| Adjustment of Viscosity | |
|---|---|
| Stearic acid | 3 parts |
| Myristic acid | 3 parts |
| Butyl stearate | 3 parts |
| MEK | 200 parts |
| Toluene | 200 parts |
| Cyclohexane | 200 parts |

The above-mentioned compositions were placed in an agitator, and mixed by stirring for 1 hour to prepare a viscosity adjusting solution. The above-mentioned viscosity adjusting solution was filtered by circulation through a Depth type filter having a 95% cut filtration accuracy of 1.2 μm for 8 hours.

After mixing of the viscosity adjusting solution filtered by circulation with the slurry dispersed, dispersing treatment was carried out in a sand mill to adjust the viscosity* to 40 cp, thereby forming a magnetic paint. The above-mentioned paint was filtered by circulation through a Depth type filter having a 95% cut filtration accuracy of 1.2 μm for 8 hours.

*) Method for measuring the viscosity: the viscosity was determined at a liquid temperature of 20° C. at a shear rate of 3000 sec$^{-1}$ with an MR-300 soliquid meter manufactured by Rheology Co.

Final Paints

To 100 parts by weight of each paint after filtration, 0.8 part by weight of an isocyanate compound (Coronate L manufactured by Nippon Polyurethane Co., Ltd.) was added, and mixed by stirring to prepare each magnetic layer paint.

Preparation of Backcoat Paint

| Preparation of Binder Solution | |
|---|---|
| Vinyl chloride copolymer (vinyl chloride/vinyl acetate/vinyl alcohol/N,N-dimethylethanolamine-modified vinyl unit/maleic acid copolymer (91/3.0/5.0/0.5/0.5/0.5% by weight, average degree of polymerization: 400) | 35 parts |
| Polyesterpolyurethane resin (containing —SO$_3$Na groups, Mn: 40000, Tg: 20° C.) | 35 parts |
| MEK | 100 parts |
| Toluene | 80 parts |
| Cyclohexane | 100 parts |

The above-mentioned compositions were placed in an agitator, and mixed by stirring for 6 hours to form a binder solution. The above-mentioned binder solution was filtered by circulation through a Depth type filter having a 95% cut filtration accuracy of 5.0 μm for 8 hours.

| Kneading-Dispersing Treatment | |
|---|---|
| Carbon black (#47B manufactured by Mitsubishi Chemical Corporation) | 100 parts |
| Carbon black (MT-CI manufactured by Colombian Carbon Co.) | 1 part |
| α-Fe$_2$O$_3$ | 1 part |
| Binder solution | 130 parts |

The above-mentioned compositions were placed in a pressure kneader, and kneaded for 2 hours. After kneading, the following compositions were added thereto to adjust the viscosity to the optimum for dispersing treatment.

| Binder solution | 45 parts |
|---|---|
| MEK | 70 parts |
| Toluene | 55 parts |
| Cyclohexane | 70 parts |

After mixing treatment, dispersing treatment was performed in a sand mill.

| Adjustment of Viscosity | |
|---|---|
| Binder solution | 175 parts |
| Stearic acid | 1 parts |
| Myristic acid | 1 parts |
| Butyl stearate | 1 parts |
| MEK | 200 parts |
| Toluene | 250 parts |
| Cyclohexane | 200 parts |

The above-mentioned compositions were placed in an agitator, and mixed by stirring for 1 hour to prepare a viscosity adjusting solution. The above-mentioned viscosity adjusting solution was filtered by circulation through a Depth type filter having a 95% cut filtration accuracy of 1.2 μm for 8 hours.

After mixing of the viscosity adjusting solution filtered by circulation with the slurry dispersed, dispersing treatment was carried out in a sand mill to adjust the viscosity* to 10 cp, thereby forming a backcoat paint. The above-mentioned paint was filtered by circulation through a Depth type filter having a 95% cut filtration accuracy of 1.2 μm for 8 hours.

*) Method for measuring the viscosity: the viscosity was determined at a liquid temperature of 20° C. at a shear rate of 3000 sec$^{-1}$ with an MR-300 soliquid meter manufactured by Rheology Co.

Final Paint

One part by weight of an isocyanate compound ((Coronate L manufactured by Nippon Polyurethane Co., Ltd.) was added to 100 parts by weight of the paint after filtration, and mixed by stirring to prepare a backcoat layer paint.

Preparation of Magnetic Tapes

A surface of each non-magnetic support (polyethylene terephthalate film having a thickness of 14.8 μm) was coated with each magnetic layer paint, followed by orientation treatment. The film coated was dried, and then treated with a 7-stage calender at a temperature of 110° C. at a linear pressure of 280 kg/cm. The film thickness of the magnetic layers of all samples after calendaring processing was 2.0 μm. Further, the back of the non-magnetic support was coated with the backcoat layer paint. After drying, the film coated was treated with a 7-stage calender at a temperature of 110° C. at a linear pressure of 280 kg/cm. The film thickness of the backcoat layers of all samples after calendaring processing was 0.5 μm.

Each film coated was cured for 24 hours in an oven heated at 60° C., then slit to a width of ½ inch, and incorporated in a cassette to prepare a magnetic tape sample. The characteristics of the resulting magnetic tape samples are as shown in Table 1.

EXAMPLES 18 AND 19

Tape samples were prepared in the same manner as with Example 2 with the exception that the vinyl chloride-vinyl acetate-vinyl alcohol-N,N-dimethylethanolamine-modified vinyl unit-sodium methacrylsulfonate copolymer obtained in vinyl chloride copolymer production (2) described above and the vinyl chloride-vinyl acetate-vinyl alcohol-N,N-dimethylethanol-amine-modified vinyl unit-2-acid phosphooxyethyl methacrylate copolymer obtained in vinyl chloride copolymer production (3) described above were each used as the vinyl chloride resins contained in the magnetic paints. The resulting tape samples had effects similar to those of Example 2.

The magnetic recording medium of the present invention comprises the non-magnetic support and the magnetic layer formed thereon which is mainly composed of the magnetic powder and the binder, wherein said binder comprises as essential ingredients three of i) the vinyl chloride copolymer having amine-modified vinyl units and acidic functional group-containing vinyl units in a molecule, ii) the polyurethane resin having a number average molecular weight of 5000 to 25000 (Mn 1), and iii) the polyurethane resin having a number average molecular weight of higher than 25000 to 100000 (Mn 2), thereby improving the dispersibility and the dispersion stability of the magnetic paint. As a result, the magnetic recording medium having the good electromagnetic characteristics and excellent in the running durability is obtained.

That is, the magnetic recording medium containing no polyurethane resin of Mn 1 is poor in electromagnetic characteristics, and the magnetic recording medium containing no polyurethane resin of Mn 2 is poor in durability and still characteristics. Further, no inclusion of amine-modified vinyl units in the vinyl chloride copolymer results in deteriorated dispersibility and electromagnetic characteristics, and no inclusion of acidic functional group-containing vinyl units also similarly results in deteriorated dispersibility and electromagnetic characteristics.

TABLE 1

| Example and Comparative Example | Vinyl Chloride Copolymer | | | Polyurethane 1 | | Polyurethane 2 | | Gloss (%) | | | Electromagnetic Characteristics | | Running Durability | Still Durability (min) |
|---|---|---|---|---|---|---|---|---|---|---|---|---|---|---|
| | Monomer Weight Ratio* (WT %) | Average Degree of Polym. | Compounding Ratio (WT %) | Mn 1 | Compounding Ratio (WT %) | Mn 2 | Compounding Ratio (WT %) | Dispersing Step (A) | Viscosity Adjusting Step (B) | (B) − (A) | 7M output (dB) | Y-C/N (dB) | | |
| Example 1 | 91/3.0/5.0/0.5/0.5 | 400 | 50 | 23000 | 20 | 30000 | 30 | 120 | 121 | +1 | +2.0 | +2.1 | ◯ | 110 |
| Example 2 | 91/3.0/5.0/0.5/0.5 | 400 | 50 | 23000 | 20 | 50000 | 30 | 118 | 122 | +4 | +1.9 | +1.8 | ◎ | >120 |
| Example 3 | 91/3.0/5.0/0.5/0.5 | 400 | 50 | 23000 | 20 | 80000 | 30 | 117 | 120 | +3 | +1.7 | +1.9 | ◎ | >120 |
| Example 4 | 91/3.0/5.0/0.5/0.5 | 400 | 50 | 12000 | 20 | 50000 | 30 | 122 | 125 | +3 | +2.1 | +2.1 | ◎ | >120 |
| Example 5 | 91/3.0/5.0/0.5/0.5 | 400 | 50 | 8000 | 20 | 50000 | 30 | 124 | 124 | 0 | +2.2 | +2.0 | ◯ | 110 |
| Example 6 | 91/3.0/5.0/0.5/0.5 | 400 | 50 | 23000 | 30 | 50000 | 20 | 120 | 120 | 0 | +2.0 | +2.1 | ◯ | 110 |
| Example 7 | 91/3.0/5.0/0.5/0.5 | 400 | 30 | 23000 | 30 | 50000 | 40 | 119 | 119 | 0 | +1.9 | +1.9 | ◎ | >120 |
| Example 8 | 91/3.0/5.0/0.5/0.5 | 400 | 70 | 23000 | 10 | 50000 | 20 | 125 | 127 | +2 | +2.3 | +2.4 | ◎ | >120 |
| Example 9 | 91/3.0/5.0/0.5/0.5 | 300 | 50 | 23000 | 20 | 50000 | 30 | 127 | 129 | +2 | +2.5 | +2.4 | ◎ | >120 |
| Example 10 | 91/3.0/5.0/0.5/0.5 | 500 | 50 | 23000 | 20 | 50000 | 30 | 116 | 119 | +3 | +1.7 | +1.8 | ◯ | >120 |
| Example 11 | 91/3.0/4.5/1.0/0.5 | 400 | 50 | 23000 | 20 | 50000 | 30 | 119 | 123 | +4 | +2.2 | +2.1 | ◎ | >120 |
| Example 12 | 91/3.0/4.0/1.5/0.5 | 400 | 50 | 23000 | 20 | 50000 | 30 | 121 | 124 | +3 | +2.2 | +2.3 | ◎ | >120 |
| Example 13 | 91/3.0/4.5/0.5/1.0 | 400 | 50 | 23000 | 20 | 50000 | 30 | 123 | 125 | +2 | +2.4 | +2.3 | ◎ | >120 |
| Example 14 | 91/3.0/4.0/0.5/1.5 | 400 | 50 | 23000 | 20 | 50000 | 30 | 124 | 125 | +1 | +2.4 | +2.4 | ◯ | >120 |
| Example 15 | 91/3.0/5.0/0.5/0.5 | 400 | 50 | 5000 | 20 | 50000 | 30 | 124 | 124 | 0 | +2.3 | +2.2 | ◎ | 110 |
| Example 16 | 91/3.0/5.0/0.5/0.5 | 400 | 50 | 25000 | 20 | 50000 | 30 | 118 | 121 | +3 | +1.8 | +1.8 | ◎ | >120 |
| Example 17 | 91/3.0/5.0/0.5/0.5 | 400 | 50 | 23000 | 20 | 100000 | 30 | 116 | 120 | +4 | +1.7 | +1.8 | ◎ | >120 |
| C. Ex. 1 | 91/3.0/5.0/0.5/0.5 | 400 | 50 | 23000 | 20 | 120000 | 30 | 110 | 111 | +1 | +0.1 | +0.2 | ◯ | >120 |
| C. Ex. 2 | 91/3.0/5.0/0.5/0.5 | 400 | 50 | 23000 | 50 | — | — | 125 | 127 | +2 | +2.1 | +2.0 | ◎ | >120 |
| C. Ex. 3 | 91/3.0/5.0/0.5/0.5 | 400 | 50 | — | — | 50000 | 50 | 109 | 111 | +2 | 0.0 | 0.0 | × | 50 |
| C. Ex. 4 | 91/3.0/5.0/0.5/0.5 | 400 | 50 | 3000 | 20 | 50000 | 50 | 125 | 120 | −5 | +1.8 | +1.7 | ◎ | 40 |
| C. Ex. 5 | 91/3.0/6.0/0/0 | 400 | 50 | 23000 | 20 | 50000 | 30 | 95 | 95 | 0 | −0.7 | −1.0 | × | >120 |
| C. Ex. 6 | 91/3.0/5.5/0/0.5 | 400 | 50 | 23000 | 20 | 50000 | 30 | 102 | 104 | +2 | −0.3 | −0.4 | ◎ | >120 |
| C. Ex. 7 | 91/3.0/5.5/0.5/0 | 400 | 50 | 23000 | 20 | 50000 | 30 | 100 | 90 | −10 | −0.8 | −0.9 | ◎ | >120 |

*)Monomer weight ratio: vinyl chloride/vinyl acetate/vinyl alcohol/dimethylethanolamine modified vinyl unit/maleic acid
C. Ex: Comparative Example
Average Degree of Polym.: Average Degree of Polymerization

What is claimed is:

1. A magnetic recording medium comprising a nonmagnetic support and a magnetic layer formed thereon which is mainly composed of a magnetic powder and a binder, wherein said binder is a mixture of
   i) a vinyl chloride copolymer having amine-modified vinyl units and acidic functional group-containing vinyl units in a molecule,
   ii) a polyurethane resin having a number average molecular weight of 5000 to 25000 (Mn 1), and
   iii) a polyurethane resin having a number average molecular weight of higher than 25000 to 100000 (Mn 2).

2. The magnetic recording medium according to claim 1, wherein said vinyl chloride copolymer has an average degree of polymerization of 200 to 800.

3. The magnetic recording medium according to claim 1, wherein the content of the amine-modified vinyl units contained in the vinyl chloride copolymer is 0.03% to 2.3% by weight, and the content of the acidic functional group-containing vinyl units is 0.05% to 1.8% by weight.

4. The magnetic recording medium according to claim 1, wherein a primary amine, a secondary amine or a tertiary amine is contained as the amine-modified vinyl unit, and a carboxyl group, a sulfonic acid group, a sulfuric acid group, a phosphoric acid group or a phosphonic acid group is contained as the acidic functional group-containing vinyl unit.

5. The magnetic recording medium according to claim 1, wherein said polyurethane resin having a number average molecular weight of 5000 to 25000 (Mn 1) is a polyesterpolyurethane resin, a polyetherpolyurethane resin or a polycarbonatepolyurethane resin.

6. The magnetic recording medium according to claim 1, wherein said polyurethane resin having a number average molecular weight of higher than 25000 to 100000 (Mn 2) is a polyesterpolyurethane resin, a polyetherpolyurethane resin or a polycarbonatepolyurethane resin.

7. The magnetic recording medium according to claim 1, wherein said vinyl chloride copolymer is contained in an amount of 20% to 80% by weight based on the total amount of the binder, said polyurethane resin of Mn 1 is contained in an amount of 10% to 50% by weight, said polyurethane resin of Mn 2 is contained in an amount of 10% to 50% by weight, and the total amount of said polyurethane resin of Mn 1 and said polyurethane resin of Mn 2 is 20% to 80% by weight.

* * * * *